US005475585A

United States Patent [19]

Bush

[11] Patent Number: 5,475,585
[45] Date of Patent: Dec. 12, 1995

[54] TRANSACTIONAL PROCESSING SYSTEM

[76] Inventor: Thomas A. Bush, 310 E. 85th St. Apt. 40, New York, N.Y. 10028

[21] Appl. No.: 191,143

[22] Filed: Feb. 2, 1994

Related U.S. Application Data

[63] Continuation of Ser. No. 591,380, Oct. 1, 1990, abandoned.

[51] Int. Cl.[6] .................................................. G06F 153/00
[52] U.S. Cl. .......................... 364/401; 364/403; 364/407
[58] Field of Search ................................... 364/401, 403, 364/408, 407; 358/84; 235/380, 492

[56] References Cited

U.S. PATENT DOCUMENTS

| | | | |
|---|---|---|---|
| 4,150,254 | 4/1979 | Schussler | 179/2 TV |
| 4,289,930 | 9/1981 | Connolly | 179/2 TV |
| 4,359,631 | 11/1982 | Lockwood et al. | 235/381 |
| 4,424,572 | 1/1984 | Lorig | 364/900 |
| 4,450,477 | 3/1984 | Lovett . | |
| 4,451,701 | 5/1984 | Bendig | 179/2 TV |
| 4,496,943 | 1/1985 | Greenblatt | 340/711 |
| 4,591,906 | 5/1986 | Morales-Garza | 358/84 |
| 4,654,482 | 3/1987 | DeAngelis . | |
| 4,704,725 | 11/1987 | Harvey et al. | 380/9 |
| 4,712,191 | 12/1987 | Penna | 364/900 |
| 4,720,849 | 1/1988 | Kou Tayama | 379/90 |
| 4,727,243 | 2/1988 | Sauar | 235/379 |
| 4,739,510 | 4/1988 | Jeffers et al. | 380/15 |
| 4,755,871 | 7/1988 | Morales-Garza | 358/84 |
| 4,755,872 | 7/1988 | Bestler et al. | 358/86 |
| 4,789,863 | 12/1988 | Bush | 340/825.35 |
| 4,794,530 | 12/1988 | Yukiura et al. . | |
| 4,807,023 | 2/1989 | Bestler et al. | 358/86 |
| 4,833,710 | 5/1989 | Hirshima | 380/20 |
| 4,845,636 | 7/1989 | Walker | 364/479 |

(List continued on next page.)

FOREIGN PATENT DOCUMENTS 0010399  4/1980  European Pat. Off. .

OTHER PUBLICATIONS

"Touchcom Interactive Video Disc Catalog" *News and Notes Video Disc*, Oct. 1985 vol. 5 No. 5 pp. 343–345.
"Setting up Shop on Computer Screens" *Nation's Business* Mar. 1984, pp. 57–58.
IBM Technical Disclosure Bulletin, vol. 25, No. 11B, Apr. 1983, New York US, pp. 5892–5893.
Questions and Answers About Pay TV, Ira Kamen, Howard W. Sams & Co. 1983, pp. 103–106, Chapters 4–7.
"Pay to View as You Fly", David Lachenbruch, *Radio–Electronics*, Dec., 1989.
"New Concepts of Addressability," *PayPerViews*, pp. 10–14, Dec., 1989.
"Audio Response Units", *PayPerViews*, pp. 19–22, Sep. 1989.
"The PPV Billing Challenge is Keeping It Simple While Obtaining Valuable Marketing Information", *Cablevision*, at 49, Jan. 15, 1990.
"The Application of National ANI to Pay–Per–View Ordering", Thomas Neville, *NCTA Technical Papers*, 1988.

(List continued on next page.)

Primary Examiner—Donald E. McElheny, Jr.
Attorney, Agent, or Firm—Morgan & Finnegan

[57] ABSTRACT

A transactional processing system is used in conjunction with a transmitting source. The system allows for real-time authorization of payments for a plurality of products and services made available by the transmitting source. A video menu is sent to a receiver representing a list of the available products and services. The receiver contains a credit or debit card reader and transmits financial account information, as well as the selection from the menu, via a modem to a payment processor. The payment processor verifies the programming selection and account information and transmits an authorization signal to the vendor or service provider. The payment processor would verify financial account information and forward payment authorization to a financial institution. The vendor, in turn sends the selected product to the consumer upon receiving payment from the financial institution.

27 Claims, 10 Drawing Sheets

U.S. PATENT DOCUMENTS

| | | | |
|---|---|---|---|
| 4,873,662 | 10/1989 | Sargent | 364/400 |
| 4,893,248 | 1/1990 | Pitts et al. | 364/464.01 |
| 4,928,177 | 5/1990 | Martinez | 358/142 |
| 4,947,028 | 8/1990 | Gorog | 235/381 |
| 5,020,129 | 5/1991 | Martin et al. | 455/4 |
| 5,042,062 | 8/1991 | Lee et al. | 379/54 |
| 5,060,068 | 10/1991 | Lindstrom | 358/185 |
| 5,072,103 | 12/1991 | Nara | 239/492 |
| 5,093,718 | 3/1992 | Hoarty et al. | 358/84 |
| 5,151,782 | 9/1992 | Ferraro | 358/86 |
| 5,191,410 | 3/1993 | McCalley et al. | 358/86 |

OTHER PUBLICATIONS

"System Will Enable Customer to Establish 'Credit Bank'", *communications Daily,* Aug. 15, 1990.

"FCC Plan to Set Up 2–Way TV", Edmund L. Andrews, *New York Times,* Business Day, p. C1, Jan. 11, 1991.

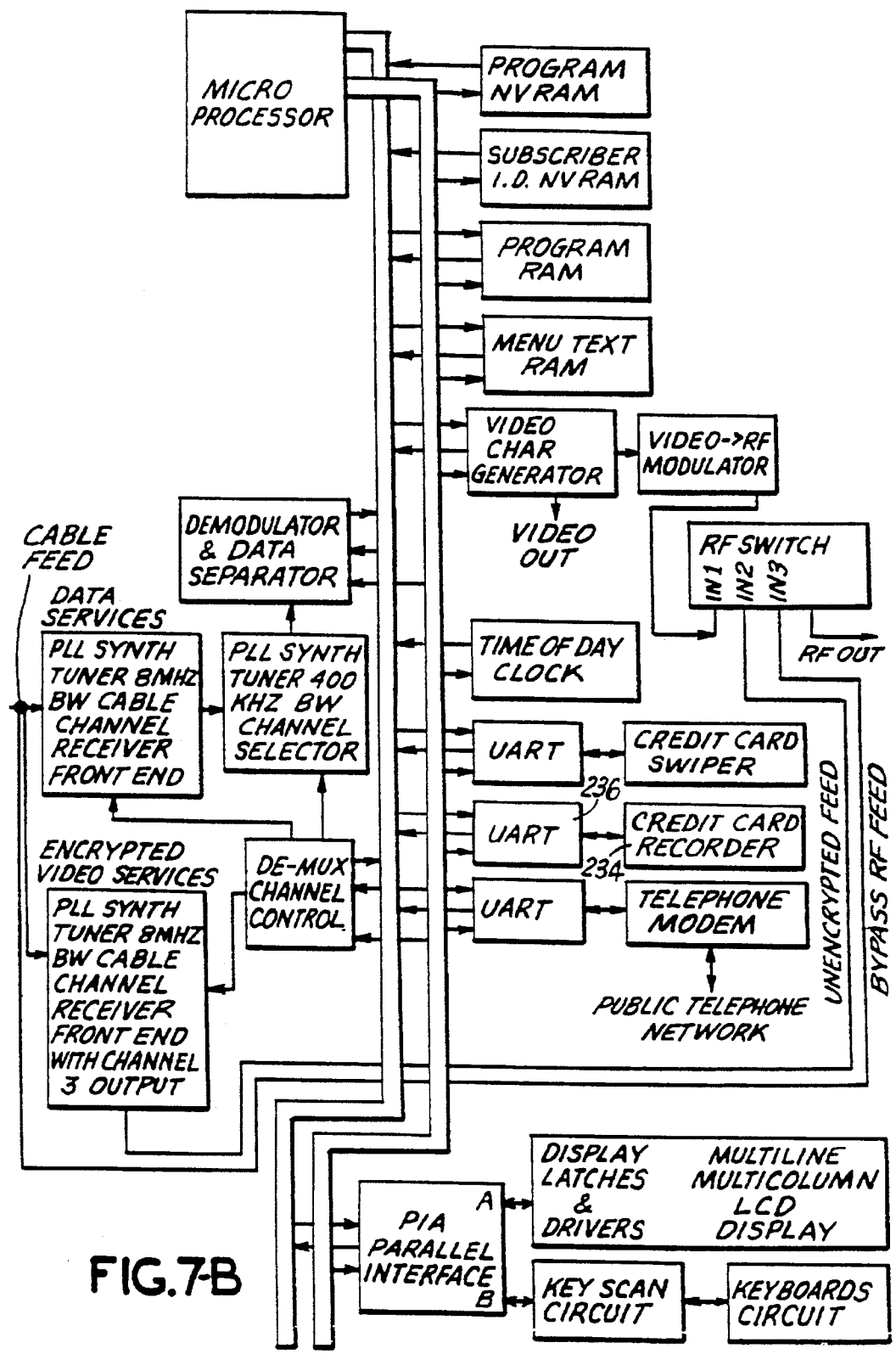
FIG.7-B

TRANSACTIONAL PROCESSING SYSTEM

This is a continuation of application Ser. No. 07/591,380, filed on Oct. 1, 1990 now abandoned.

BACKGROUND OF THE INVENTION

The advent of Cable transmission has opened up an extensive network of pay-per-selection markets to the consumer. A complete array of visual and audio entertainments from movies to live and pre-recorded concerts and sporting events can now be brought directly into the consumer's home. Additionally, the cable viewer has access to a variety of goods and services via several shopping channels.

Presently, the home market is restricted by the amount of time required to complete a pay-per-selection transaction. If an individual desires to purchase a good or a service, he or she must first contact the system operator, place the order, and then provide the operator with credit card information. The operator, in turn, must then contact the consumer's financial institution to verify the billing information provided by the consumer. Once the system operator has been assured of receiving payment for the desired goods or services, then the consumer can receive the chosen goods or services. Due to the interaction between the consumer and the operator, efficiency of the system would be degraded and a resulting built-in capacity would limit the number of transactions.

Alternatively, the operator can merely collect billing information and process it in a batch method at selected intervals. Although this method is faster than clearing each transaction individually, the operator will be exposed to a certain number of uncollectible transactions.

Accordingly, there exists a need for a transactional processing system which would allow for efficient, real-time authorization of consumer transaction for a wide variety of services and products.

SUMMARY OF THE INVENTION

With the foregoing in mind it is an object of this invention to provide a new and improved real-time transactional processing system.

It is a further object of this invention to provide a non-interactive system where providing merchandise or services would be both convenient for the consumer and reliable for the retailer.

It is still a further object of this invention to provide a convenient billing process where the need for mailing bills or for interacting with a service operator is removed.

It is still another object of this invention to provide a real-time credit authorization, thereby assuring payment on every transaction and eliminating batch or interactive billing processes with the vendor or service provider.

The present invention comprises a transmitting source, a receiver and a transaction processor. The Source broadcasts one or many menus over a transmission channel, e.g., a T.V. cable channel. The consumer would have a wide variety of options to choose from the menu, depending on the available services provided by the source. The menu received by the customer could list many different products or services available to pay for, for example; (1) paying for cable bill; (2) paying utility bills; (3) paying bills for merchandise purchased; (4) purchasing entertainment, concert or sporting event tickets; (6) purchasing from any mail order catalog; (7) donating to fund raising events.

The system's receiver is in communication with the transmitting source and is also linked to a transaction processor. The transaction processor, verifies the consumer's financial data, authorizes the proposed transaction and enables the consumer to complete the desired transaction.

The receiver is equipped with a card reader for, by way of example, a bank issued credit or debit card, to enable the receiver to obtain and transmit information about an individual's account to the transaction processor. The consumer selects an item from the menu, and the receiver then transmits the information corresponding to that selection, as well as consumer's financial account information, to the transaction processor via a modem. The transaction processor then verifies the consumer's financial information, and provides real-time authorization of payment for the selection. Next, the transaction processor (if not a financial institution) would transmit a payment authorization signal to a financial institution. The financial institution in turn pays the retailer. The retailer could then send the consumer, the ordered product or service, or a receipt for the paid bill.

BRIEF DESCRIPTION OF THE DRAWINGS

FIG. 7B is a block diagram of the operation of Transactional Processing System receiver with a credit card recorder option.

DETAILED DESCRIPTION OF THE INVENTION

Figure 1A:
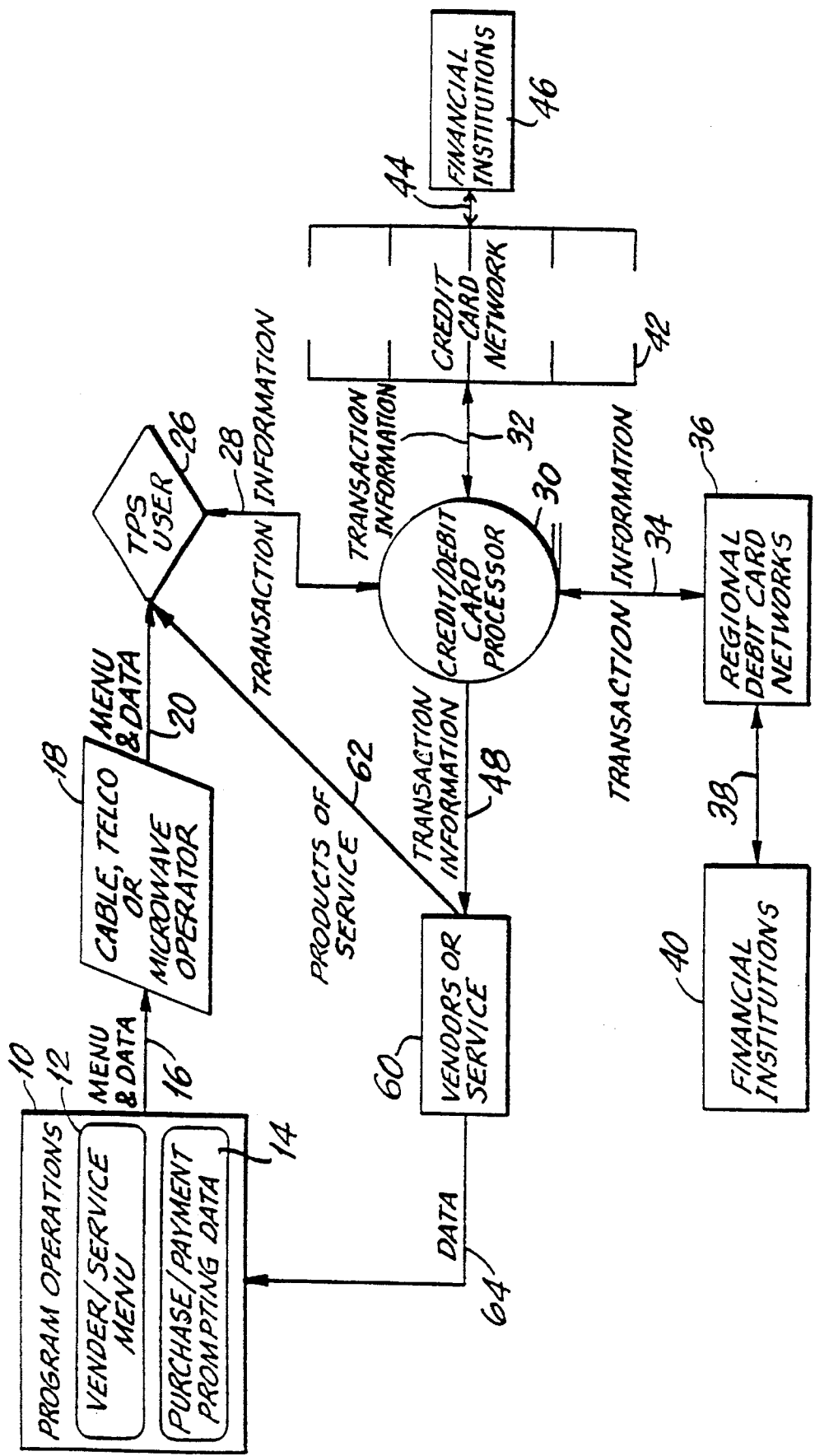
FIG. 1(A) is a block diagram of Transactional Processing System (TPS)

Referring now to the drawings in which like numeral represent like components, FIG. 1. illustrates a block diagram of Transactional Processing System (TPS). A Transmitting source 10 would broadcast a signal representing a menu. In the preferred embodiment this signal is video. The transmitting source 10, therefore, broadcasts one or many video menus, offering the consumer the option to pay for either a product or a service. The menu information 12 contains the picture or graphic information corresponding to vendors and services available in the system. The menu information could be broadcasted through a transmission channel 16 to a receiver 18 typically operated by a cable, telephone company, microwave ,TVRO or DBS operator. In a preferred embodiment described herein, cable operator 18 would in turn transmit information to receivers 26 within its broadcast area, through transmission channel 20. Transmission channel 16 can be a full video channel or a narrow band channel through a satellite uplink-downlink.

The menu information 12 could be an aggregate of many pictures corresponding to various products or services combined into one full video signal and demodulated into narrow band information, whereby the TPS receiver would allow the customer to choose from many different menus without the cable operator 18 giving up a wide band or prime video channel.

In addition to menu information 12, the transmitting source 10, would also broadcast prompting data 14, which represent the necessary information to electronically prompt a subscriber through the process of purchasing an item via a mail order catalog or paying for a selected service. Once the vendor or service is selected the prompting data for each vendor or service would be downloaded into a RAM within the receiver 26. The prompting information for each vendor or service could then be displayed on an LCD within the receiver 26 or in a television set connected to the receiver 26. It is also possible to combine both the picture and prompting data information and transmit the combination to receiver 26.

The user at receiver 26, makes a menu selection and answers the questions or prompts, pertinent to the selected vendor or service. The user then wipes a credit/debit card through receiver 26 which allows the credit/debit card to be authorized and a purchase or payment be made. The card information would be transmitted from receiver 26 to transaction processor 30 via transmission channel 28. Typically receiver 26 would transmit the user selection and the financial account information via a modem, through a telephone line to transaction processor 30. The transaction processor 30 would then verify the user's financial account. This includes verifying whether the consumer does in fact have the requisite sum available in the chosen account to pay for the selection made.

In the event that the consumer has used a credit card, the transaction processor 30 would then forward the verified information to a regional credit card network 42, through transmission channel 32. This information would be then forwarded to a participating financial institution 46, through transmission channel 44. The financial institution 46 would in turn pay the vendor or service provider 60, and the consumer would receive a bill or receipt for that particular transaction. Similarly, in the event that the consumer has used a debit card, the transaction processor 30, would then forward the verified information to a regional debit card network 36, through transmission channel 38. This information would be then forwarded to a participating financial institution 40, through transmission channel 38.

The transaction information would be also transmitted from transaction processor 30 to vendor or service provider 60, via transmission channel 48. Vendor or service provider 60 would then in turn provide the service or the goods purchased to the user via appropriate channels. Vendor or Service provider 60 could also send purchasing data to transmitting source 10 via transmitting channel 64 for upgrading service and product information, product availability, price change, products purchased and various other information.

There are various scenarios in which a transaction information could be verified. For example, in order for the consumer to be assured that the selected product or service can be delivered on a specific desired terms the transaction processor 30 would cross check the transaction information transmitted through channel 28 with the corresponding vendor or service database. Once that transaction has been cross-checked, the credit card processor 30 would send the authorization signal. Alternatively the vendor/service provider 60 may update its corresponding database and transmit such updated information to transmitting source 10. Transmitting source 10 would then change the menu 12 and prompting data 14 and continuously broadcast the updated information to receivers 26. Actual cross-check before authorization could be made locally in receiver 26. Hence customer's selection would be compared with updated information broadcasted to receiver 26 for product verification purposes.

Figure 1B:
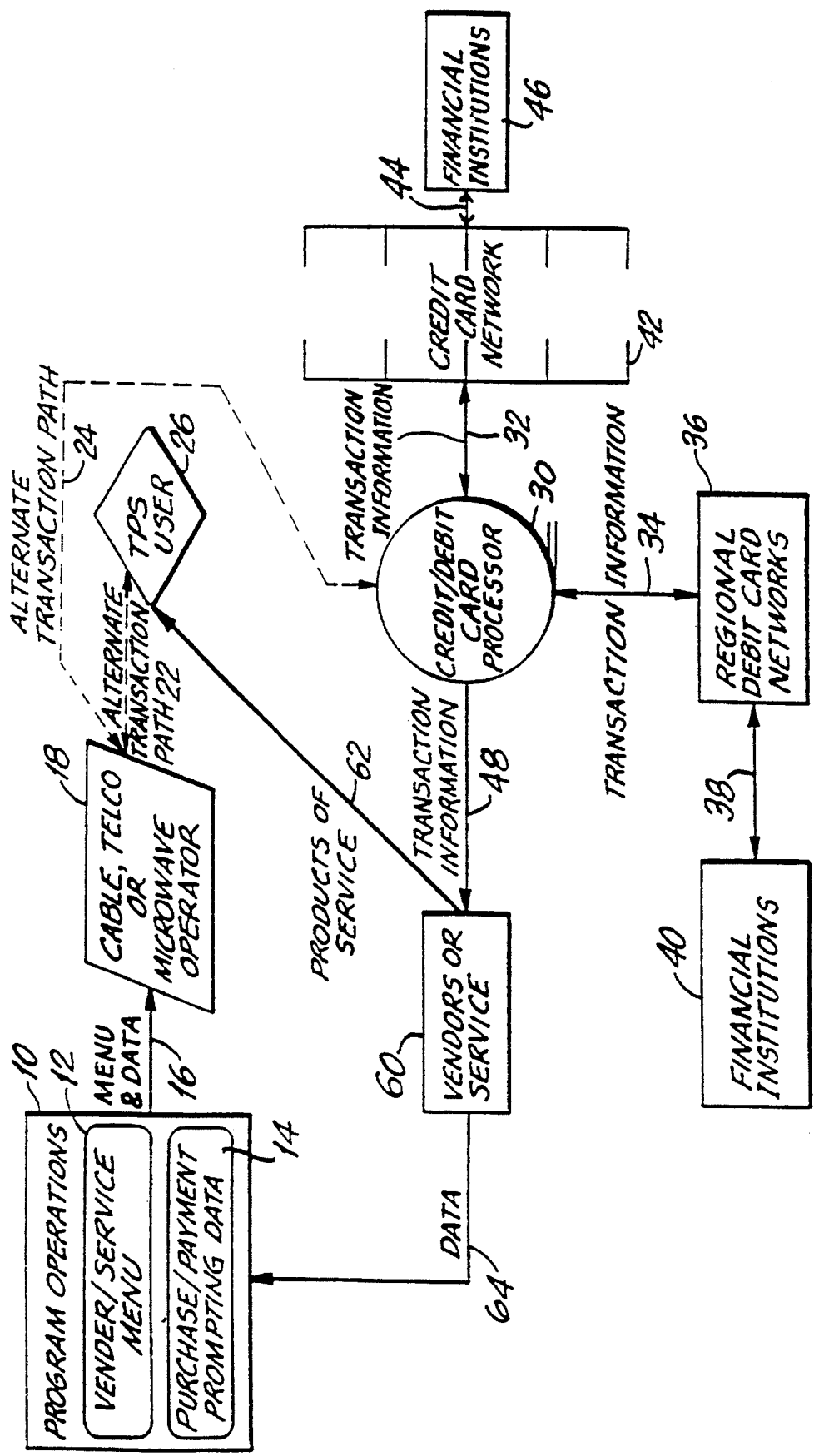
FIG. 1(B) is block diagram of an alternate embodiment of Transactional Processing System.

FIG. 1B depicts an alternate communication path for transaction authorization. When cable operator 18 requires to monitor all transaction interactions the consumer through receiver 26 would make a selection. The information representing such selected service or product would be transmitted to cable operator 18 via transmission channel 22. Cable operator 18 after receiving the transaction information would retransmit such information to transaction processor 30 via transmission channel 24. Thereafter the transaction verification would proceed as discussed before.

There are, however, situations when up to the minute information is critical to the consumer and the retailer. A typical scenario is providing a limited product or service to a pool of consumers. This includes tickets for a performance or a sporting event. Since the available seats are very limited it would become impractical to update the database by service provider 60, transmit that database to source 10, and retransmit that information to receiver 26 for verification purposes.

Figure 2:
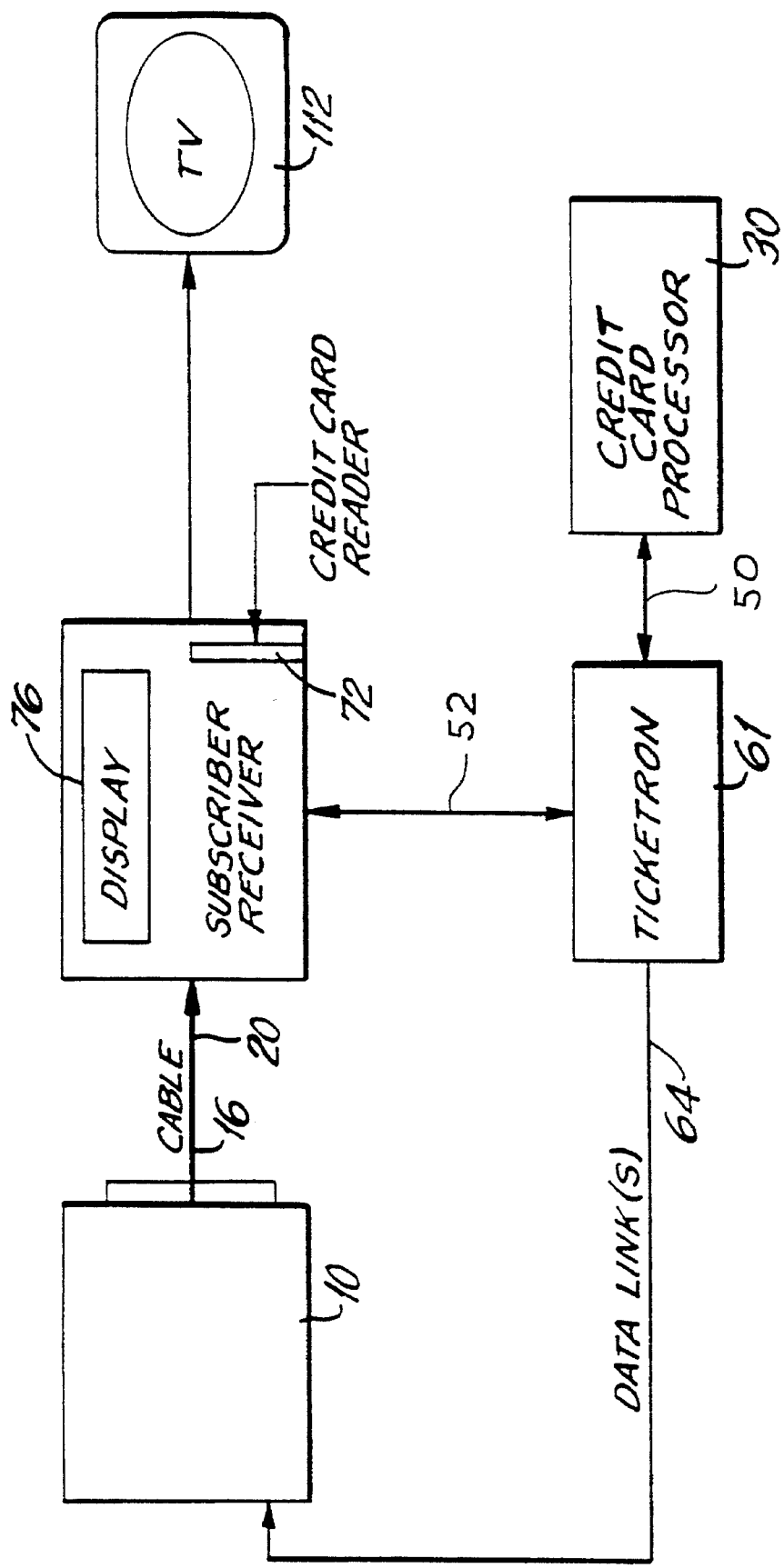
FIG. 2 is a block diagram of a TPS for real-time services requiring continuous update.

An alternate communication path as depicted in FIG. 2 could thus be established, wherein TPS user through a series of prompts would select the desired event. The information representing the user's choice would be transmitted to a ticket provider 61 like Ticketron, via transmission channel 52. The Ticket provider 61 contains a database wherein available seats are continuously updated and the desired selection would be cross-checked against that database. If desired seat is available, the Ticket provider 61 would transmit the transaction information to transaction processor 30 via transmission channel 50 for credit authorization. Once the credit is authorized as described hereinabove, the credit processor would transmit the verification signal to ticket provider 61, wherein the database contained therein would be updated and a confirmation message would be transmitted to the receiver 26 via transmission channel 52. The ticket provider 61 would transmit updated event availability and other pertinent information to source 10 through transmission channel 64.

Figure 3:
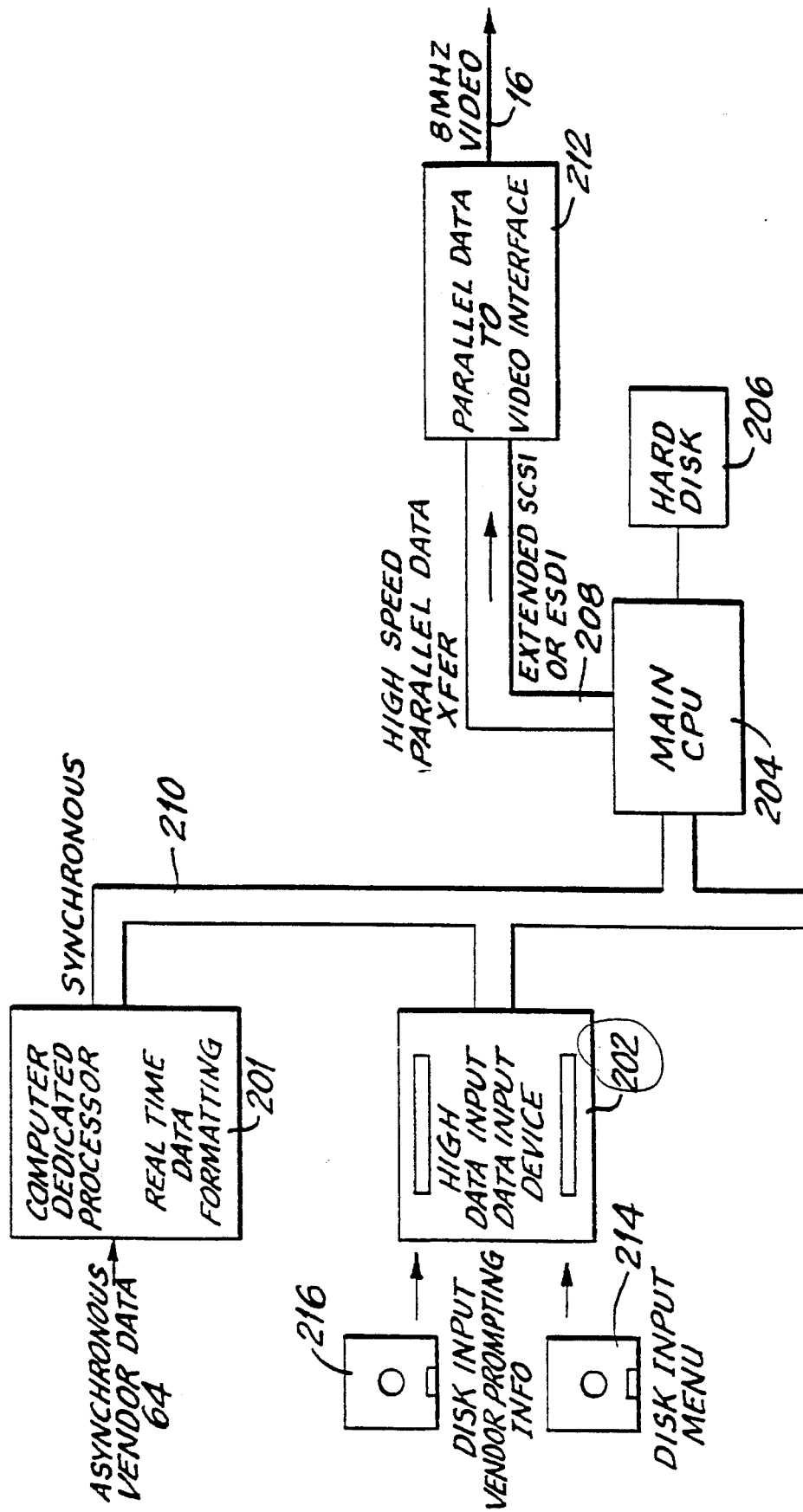
FIG. 3 is a block diagram of a TPS transmission system.

FIG. 3 shows the block diagram of transmitting source 10, wherein all the pertinent information for system's operation is programmed and accordingly transmitted to receivers 26. Vendor or service provider's data can be transferred to the transmitting source 10, either through asynchronous communication or by hard copy data like computer disk storage. In FIG. 3, the high capacity data input device 202, has the ability to load menu(picture or graphics) and prompting data information via external disk storage devices 214 and 216. Alternatively, both the video and prompting information could be combined and fed into the data input device 202 together. Various vendors who do not maintain an in-house database, could periodically update their product information and send the updated information to TPS programmer, in the form of computer disks 214 and 216. That information would be then transferred to the Main CPU 204, which controls the overall data formatting, and transmits the formatted data to parallel data to video interface 212.

In situations where the vendor or the service provider maintains a database for updating the product information, transmitting source 10 would be connected to that database via communications channel 64. The high speed vendors' or service providers' data would then be transmitted asynchronously from corresponding databases to computer dedicated processor 201. That information would be buffered within processor 201. The processor 201 would then perform packet formatting and output this data in a synchronous manner that is polled by the main CPU 204.

The main CPU 204, would perform time multiplexing to gather data belonging to various vendors and service providers. The data along with the formatted menu, prompting data and other housekeeping information will be time multiplexed and assembled by the main CPU 204 for transmission over the parallel bus to the parallel data to video interface 212. The video interface 212, converts the digital data into video format for transmission to receivers 26. In the embodiment mentioned herein, video interface 212, is model 17480, by Quantel.

Hard disk 206 stores all the necessary information for the transmitting source 10. Data from main CPU 204 to video interface 212, is transmitted via an extended SCSI or ESDI, as commonly known in the art.

Figure 4:
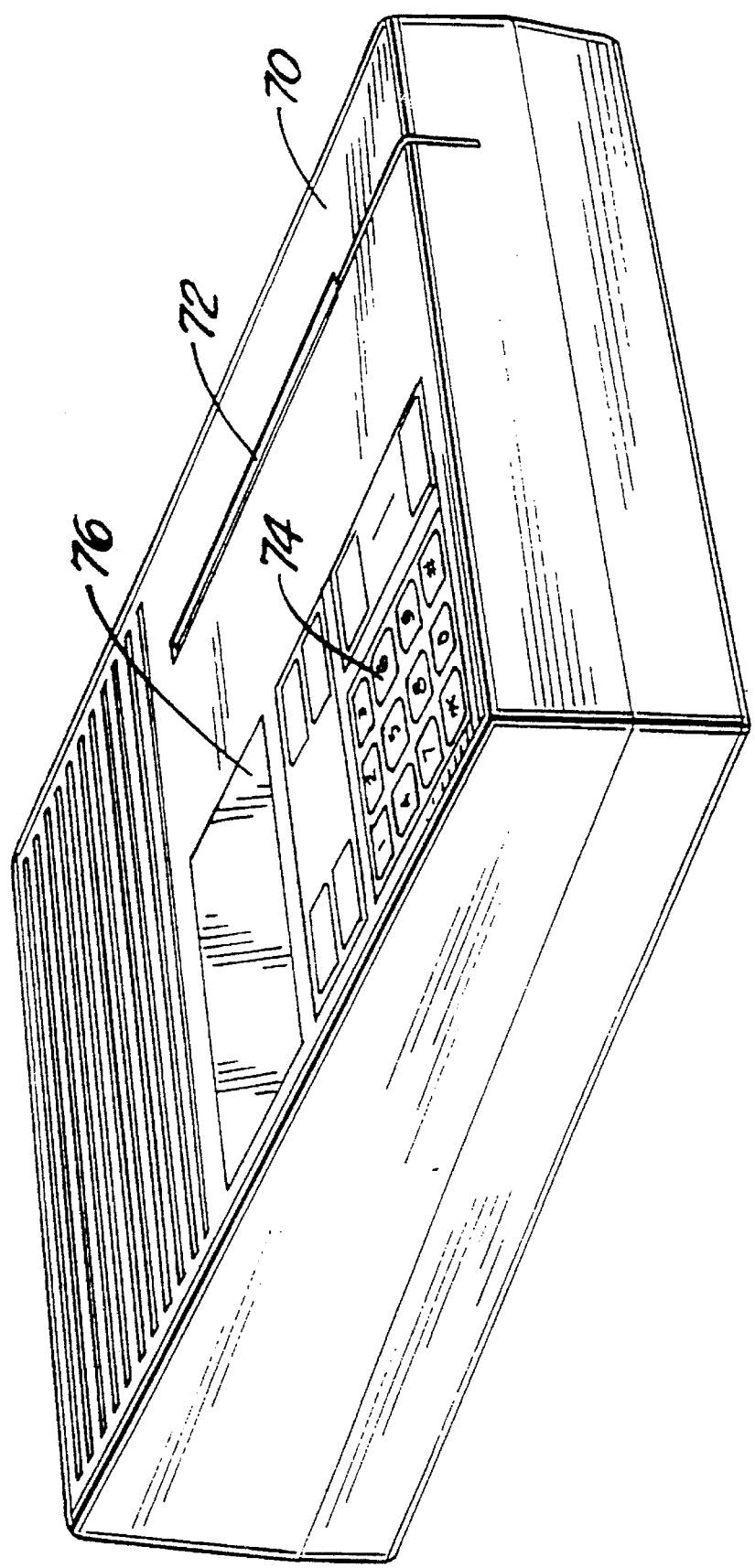
FIG. 4 is a diagram of Transactional Processing System key-box.

FIG. 4, depicts a side elevation of receiver 26 wherein slot 72 provides the space for wiping the credit or debit card. Display 76 allows for the user to page through the menus and their corresponding prompts. Keyboard 74 allows for various control functions.

Figure 5:
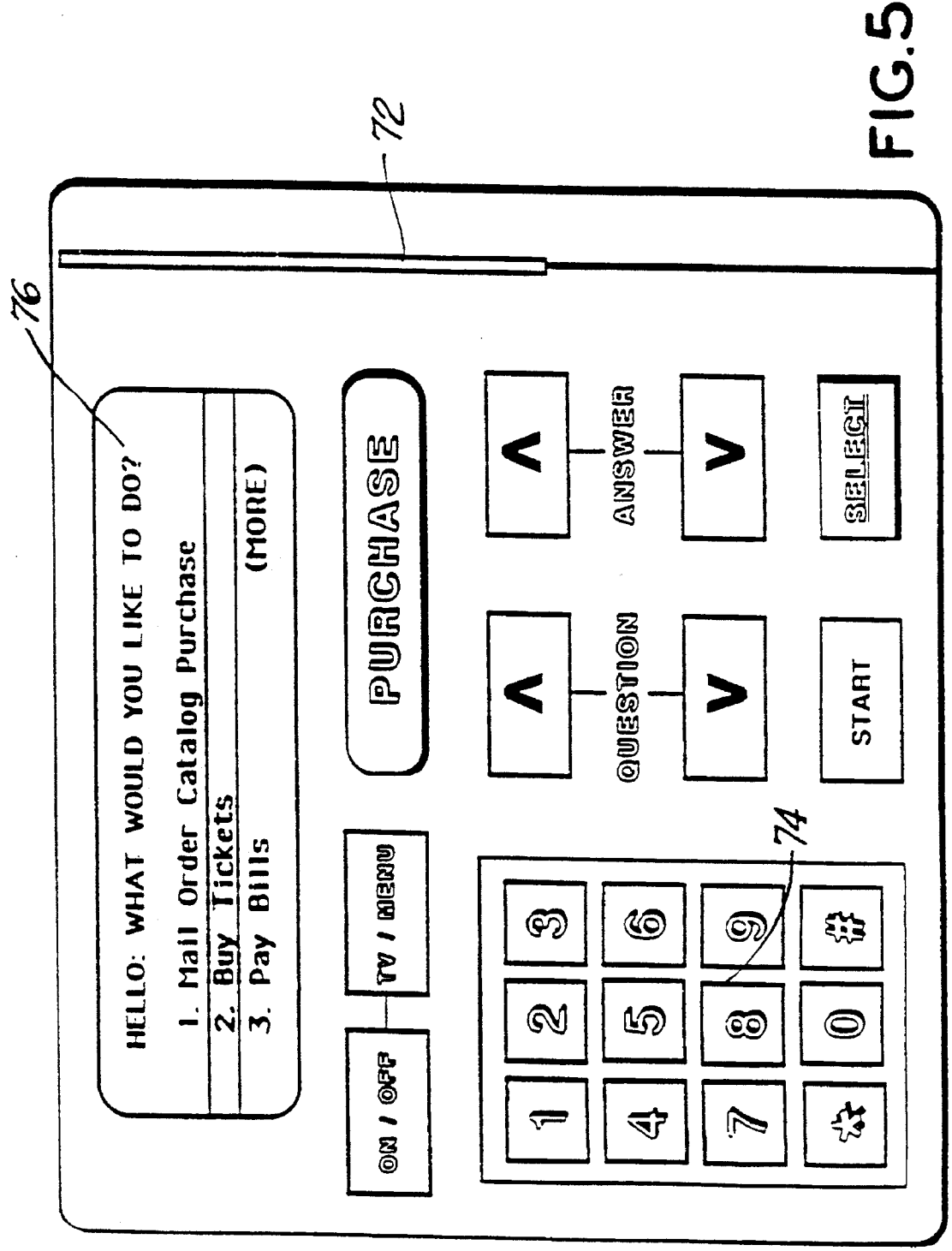
FIG. 5 is a top view diagram of Transactional Processing System receiver.

FIG. 5, depicts the top view of receiver 26, wherein a sample menu on display 76 has been shown. TPS user by pressing appropriate buttons may page through various prompts and answer them accordingly for a desired product or a service.

Figure 6:
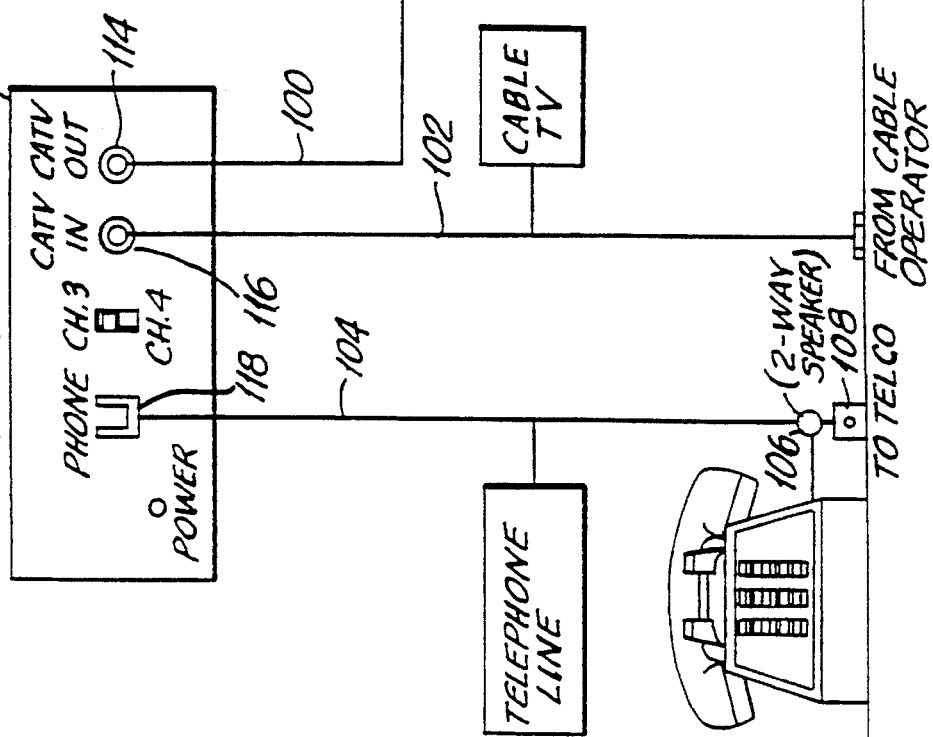
FIG. 6 is a diagram of receiver installation.

FIG. 6. depicts TPS receiver 26 installation diagram. Line 102 carries the information signals from cable operator to receiver 26 through cable-in jack 116. Various signal processing functions as will be discussed hereinafter would be conducted on the information signals. The menu and prompting information would then be transmitted to TV set 112 through line 100. Phone line 104 sends the transaction information to telephone company line through jack 108. 2-way splitter 106 allows for both the telephone set 110 and receiver 26 use the same phone line accordingly.

Figure 7A:
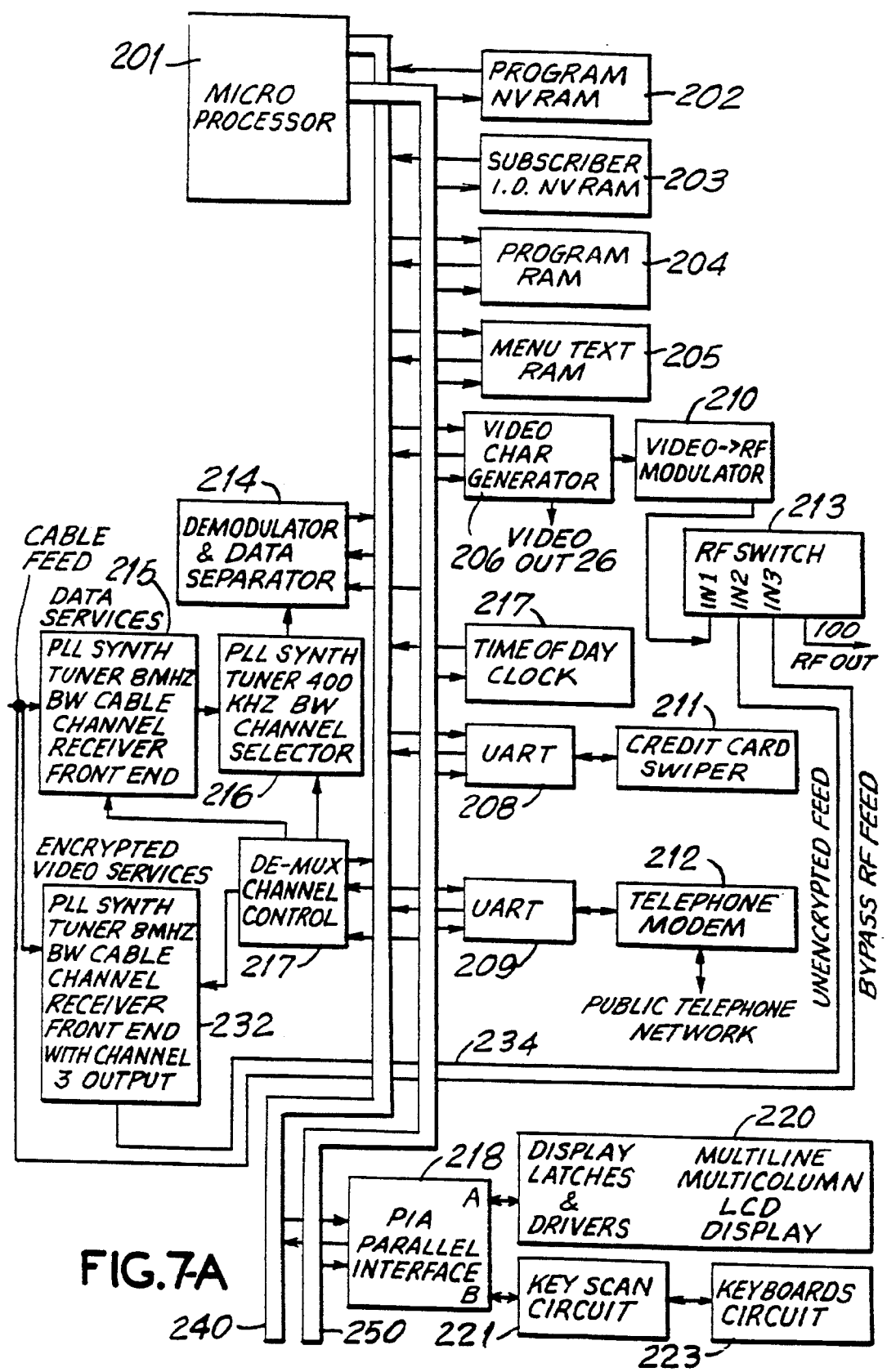
FIG. 7A is a block diagram of the operation of Transactional Processing System receiver.

The actual data processing within receiver 26 will be next explained based on the block diagram depicted in FIG. 7A. Receiver 26 would decode the data transmitted into cable feed 116. This data may contain menu and prompting information for various vendors or service providers. Microprocessor 201 controls all the functions of receiver 26. Menu and prompt information are initially encoded into multiple subchannels and all the multiple subchannels are encoded into one cable channel with 8 MHz bandwidth. Phased Locked Loop (PLL) synthesized tuner 215 selects the initial cable channel which would contain all the various subchannels. Phased Locked Loop synthesized tuner 216 outputs an intermediate carrier frequency which has the selected subchannel encoded on to it, wherein the desired menu and prompting information are contained. TPS user by pressing the desired selection would prompt microprocessor 201 to send the proper information to channel control 217. Channel control 217 will in respond send the data for setting the demodulating frequency in tuners 215 and 216, corresponding to the desired menu and prompt information.

Demodulator data separator 214 takes the RF channel that was selected by tuners 215 and 216 and steps down the carrier frequency and separates the desired data from the carrier frequency. The demodulated data would be then presented in parallel format onto the CPU bus 240, for transfer through microprocessor 201 to menu text ram memory 205. Encoded indexing data would be presented to microprocessor 201, in demodulated packets of data, that would be used as cues for the various types of menuing data, under program control, so that appropriate menus and text would be placed in the correct memory in the desired sequence and location.

Memory 202 is a non volatile read and write memory (NVRAM) which contains all of the main program instructions for operating receiver 26. NVRAM 203 would contain a unique subscriber I.D. Subscriber I.D. could be electrically erasable and therefore it could be remotely programmed with a unique I.D. number.

RAM 204 is just a scratch pad memory for use by the microprocessor 201 for conducting various calculations and memory moves that are necessary in operating the receiver.

Menu text RAM 205, is a paged RAM for storing individual pages of display text memory which can then be accessed, a page at a time and dumped out into the video character generator 206 which would probably have a single page of RAM. Menu text RAM 205 would hold as many pages as necessary for the system.

Video character generator 206, would take individual pages of RAM loaded in menu text RAM 205, and then transmit the information in the form of video signal, into line 226 which is a direct video output. Video character generator 206 may also transmit video information to video RF modulator 210 which in turn feeds the information into RF switch 213. RF switch 213 selects the proper input and feeds the video information through line 100 into the television receiver 112. The menu and data information would, thereby, be displayed on the television 112 display.

Block 207 represents the time of day clock for any real time actions that the microprocessor requires for proper operation of the system. Time of day clock is of importance when the service provided is an event that is broadcasted through the cable to authorized receivers only. The consumer can select a desired program to view at a specific time of the day. The transmitting source 10, continuously sends the scheduling information and the choice of programs available to view. The receiver 26, would then cross-check the actual time and date of the desired transaction with the database being sent by transmitter source 10. Once the actual transaction is verified, the financial information would be sent to transaction processor 30, for payment authorization. Upon approval, microprocessor 201, would send the appropriate signals to channel control 217, at the desired time and date, which in turn transmits the appropriate tuning codes to PLL synth tuner , for tuning to the encrypted signal that carries the desired program. PLL tuner 232 is typically tunable to a 8 MHz cable channel, acting as a receiver front end with channel 3 output. The output of PLL tuner 232, sends an unencrypted signal via line 234 to RF switch 213, wherein the signal representing the desired program would be sent to the T.V. set through RF output of RF switch 213.

A UART 208 is connected to a credit card swiper for taking information in from a credit card. The data received from credit card, would then be verified by microprocessor 201 and or transmitted through UART 209 and modem 212 to transaction processor 30 via the public telephone network for credit card verification and charge.

Programmable peripheral interface (Parallel Interface) 218, is a dual 8 bit parallel port with a defined bus address. Port A of 218 drives an 8 bit addressable multi-line multicolumn LCD Display with internal display drivers 220. Key Scan circuit 221 and Keyboard circuit 223, generate appropriate signals upon depression of keyboard buttons 74. The generated signals are then presented to port B of parallel interface 218.

The channel selection is done by TPS user by pressing the appropriate selection on keyboard 74. The appropriate vendor or service whose information is encoded into a specific channel would correlate to the key depressed by the TPS user. The microprocessor 201 would then load the proper control codes into channel control 217 for selecting the channel containing the corresponding desired menu and prompting data or encrypted video.

RF switch 213 is a 3 by 1 switch which could also bypass the cable feed directly to television 112 without processing the data. Video character generator 206 as stated above would also have a direct video out for users who would want to view the information at a high quality monitor instead of television sets. Microprocessor 201 can be a relatively simple 8 bit microprocessor with a high clock rate which would serve the needs of the system.

FIG. 7B is another TPS keypad schematic with an additional improvement for credit card recording. With the advent of smartcards, it is possible to store pertinent financial information of various institutions on a memory located on one smartcard only. It is possible to update the stored memory on said smartcards by connecting a smartcard recorder 234 to receiver 26, through UART 236. The information on the smartcard can be then remotely read or recorded via microprocessor 201 for updating purposes, and thereafter for transmitting the financial information, for the appropriate transaction. This additional option allows for a widespread use of smartcards, which up to now were hindered for lack of a proper and convenient method of updating the information stored in the cards.

Figure 8:
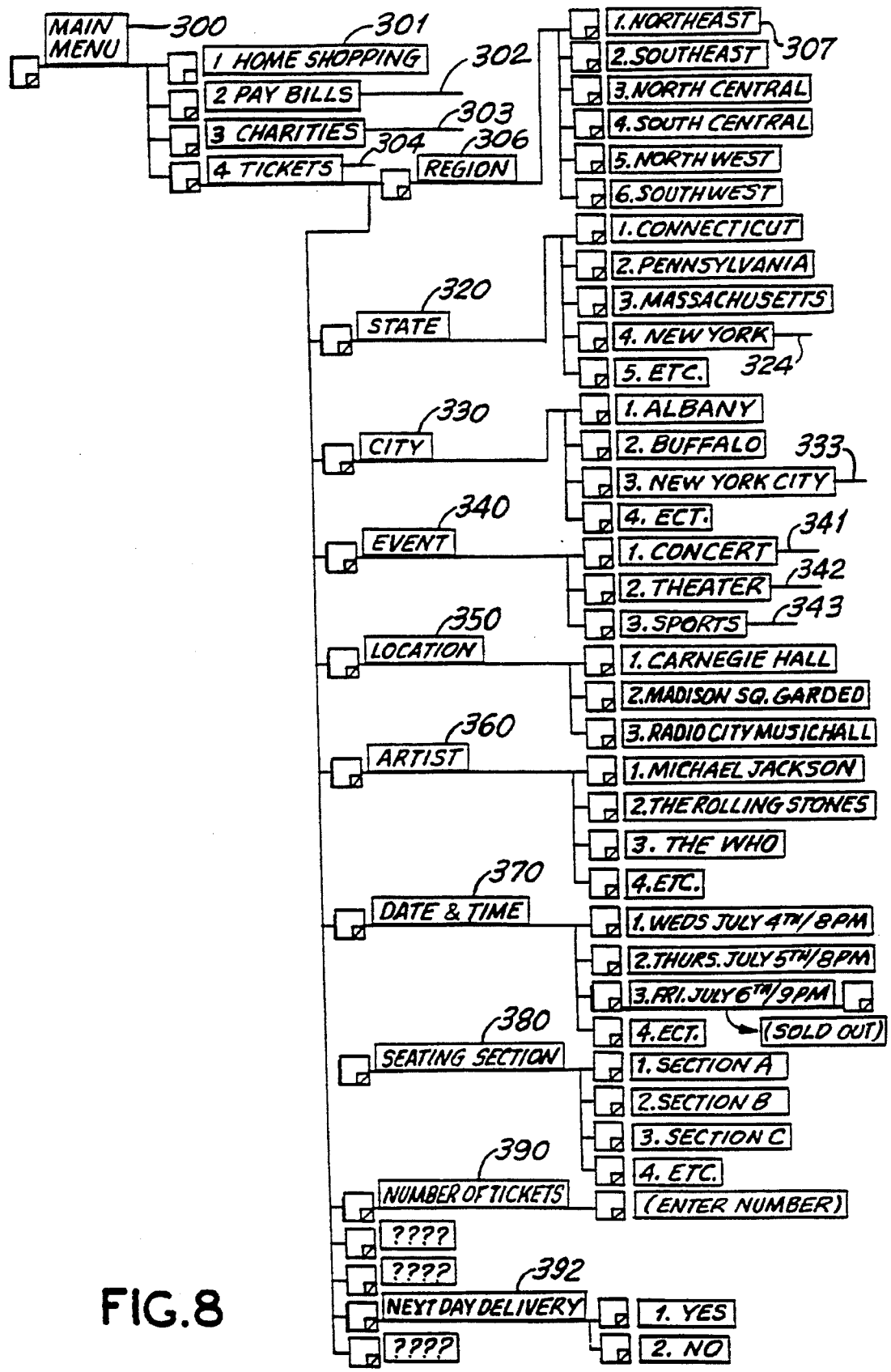
FIG. 8. is a flow chart of interaction between consumer and a typical menu.

FIG. 8. is an example of questions and answer prompts for ticket purchasing described herein above. The main menu contains various service or product selection. The TPS user would select prompts for purchasing a desired ticket. The prompt would change into more specific questions like region, state, city, event, location, artist, date & time, seating section number of tickets, next day delivery, etc. Every category would be subdivided into more specific questions whereby the user can select the precise event and schedule accordingly.

More specifically a typical menu as shown in FIG. 8 would first have a main menu display 300. The consumer by pressing a button could select one of many services available in the system. For purposes of example, this may include Home Shopping 301, or Paying Bills 302, or Charity donation 303, or Ticket Purchasing 304. Assuming that the consumer has selected the Ticket Purchasing option 304, the system then displays a variety of choices, including Region 306, State 320, City 330, Event 340, Location 350, Artist 360, Date & Time 370, Seating Section 380, Number of Tickets 390, and Next Day delivery 392.

The consumer can purchase tickets based upon the information shown on the display. For example the menu can prompt the consumer on the desired region in the country. Assuming that the consumer has selected Northeast region 307, the menu then inquires on the States located in that region. Upon selecting New York State 324 from the State 320 menu, the major cities in the selected State would be displayed. Assuming that New York City 333 is selected, then the available events in New York City would be displayed on event menu 340. The event could be concert 341, or Theater 342, or Sports 343. Depending on the event selected the corresponding location to that event would be then displayed on location menu 350. Once the consumer selects a desired location, the menu then displays various artists performing in the selected location, on display menu 360. The consumer then selects the desired artist, which in turn allows for the dates and times of the artist's performance be displayed on Date & Time menu 370. Since receiver 26 is directly communicating with Ticket provider's database, up to the minute information can be verified. Upon selecting the date and the time of the desired event, the Seating Section menu 380, then displays the available seating areas. Once the seating section is chosen, the Number Of Tickets menu 390 asks for the desired number of tickets. The next prompt would be delivery of the actual purchased tickets, which could be done by mail or at the theater counter.

The receiver 26 can be used for various purposes; purchasing products from various catalogs; obtaining instant ticket access; a media news channel whereby the viewer can access the channel by selecting the appropriate menu selection; ballot box, where a convenient 900 number voting service may be used, whereby the user by pressing a button on the menu would select a voting option on the video menu and receiver 26 would dial a 900 number for voting purposes; donation box, whereby a viewer by pressing appropriate menu selection and wiping the credit card off the receiver 26 may donate to a desired charity; software downloading where the user may rent or purchase a particular software broadcasted by transmitting source 10 and any other application. The software may include video games available for rent and eventual purchase. The consumer hence would be able to try a video game through recevier 26 and through appropriate downloaded software for operating the microprocessor 201 of FIG. 7A. The service provider could charge the consumer on a periodic basis; It is also possible to control receiver 26 by a remote controller with credit card reading ability, whereby the transaction information can be conducted remotely from the receiver 26. Video information can also be fed into a computer and hence allow a computer interaction with the system for various purposes within the scope of this invention.

While the invention has been described in its preferred embodiments, it is to be understood that the words which have been used are word of description, rather than limitation, and that changes may be made within the preview of the appended claim without departing from the scope and spirit of the invention.

I claim:

1. A transactional processing system for purchasing products and services from a plurality of available products and services and processing corresponding financial transactions in real-time comprising:

(a) a programming transmitter means for broadcasting and updating a plurality of transaction information sets associated with said plurality of available products and services via a first communication channel, said first communication channel having a plurality of subchannels, said subchannels each transmitting channel having a plurality of subchannels, said subchannels each transmitting a corresponding transaction information set in said first communication channel;

(b) a plurality of receiver means each serving one user for receiving in each receiver means the identical transaction information sets broadcast from said programming transmitter, each one of said receiver means including RAM storage means, and means for downloading and storing within the RAM storage means a desired transaction information set from the broadcast information sets received within each of said receiver means and to select a desired transaction for purchasing a product and service associated with said selected transaction information set, each of said receiver means including means for transmitting financial information of the user; each of said receiver means including a processor, programmed instructions and stored information for acting on downloaded information, and means for generating signals to said processor for modifying the downloaded information based on the programmed instructions, stored information and the downloaded information;

(c) means forming a second communication channel originating at said plurality of receiver means and through which the financial information of respective users which is processed at said receiver means is transmitted; and (d) transaction processor means coupled to said second communication channel for receiving the financial information of respective users generated at respective receiver means, said transaction processor including means for generating an authorization signal through said second communication channel to respective receiver means to authorize said desired transaction in real time for said selected products and services.

2. A system according to claim 1, wherein each one of said transaction information sets further comprise a plurality of prompting data corresponding to said products and services for prompting users to make a selection.

3. A system according to claim 2, wherein each one of said transaction information sets further comprise:

A plurality of graphic information corresponding to said available products and services.

4. A system according to claim 1, wherein said first communication channel further comprises:

(a) a satellite uplink/downlink transmission between said programming transmitter and one operator means for receiving and transmitting information; and (b) a broadcast channel from said operator means to said receiver means.

5. A system according to claim 1, wherein said second communication channel is a telephone line.

6. A system according to claim 2, wherein said transaction processor before authorizing said desired transaction, verifies said financial information of said user and transmits an authorizing signal to a financial institution, said financial institution making payments to vendors or service providers.

7. A system according to claim 6, wherein said transaction processor further transmits transaction information to said vendors or service providers, allowing said vendors or service providers supply selected products or services.

8. A system according to claim 7, wherein said vendors or service providers transmit updated information on their product and service to said programming transmitter.

9. A system according to claim 2, wherein said receiver means further comprises a slot for wiping a credit card.

10. A system according to claim 3, wherein said receiver means is connected to a television set, said graphic information and said prompting data being displayed on said television set.

11. A system according to claim 2, wherein said receiver means comprises an LCD display means for displaying said prompting data.

12. A system according to claim 3, wherein said receiver means comprises an output means for transmitting video signals representing said graphic information and prompting data to a video monitor.

13. A system according to claim 2, wherein said receiver means further comprises:

(a) a receiver microprocessor means for controlling various functions of said receiver means, said receiver microprocessor means connected to a data bus and to an address bus;

(b) a tuning and demodulating means for receiving and demodulating a channel containing selected graphic and prompt information, said demodulating means connected to said data bus and said address bus;

(c) a first memory means for storing a program for operating said receiver, said memory means connected to said data bus and said address bus;

(d) a second memory for storing said graphic and prompt information, said second memory means connected to data bus and said address bus;

(e) a video character generating means for converting said graphic and prompt information into video signals, said video character generating means connected to said data bus and said address bus;

(f) a first interface means for displaying said graphic and prompt information on an LCD display said first interface means connected to said data bus and said address bus;

(g) a second interface means for scanning a key pressed on said receiver, said second interface means connected to said data bus and said address bus;

(h) a third interface means for connecting a card swiper wherein card information from a credit or debit card can be read by swiping said card through said card swiper and said card information can in turn be fed into said third interface, said third interface connected to said data bus and said address bus; and (i) a fourth interface means for connecting a telephone modem, wherein transaction information corresponding to a selected product or service can be transmitted by said modem from said receiver to said transaction processor, said modem receiving data from said fourth interface means, said fourth interface means connected to said data bus and said address bus.

14. A system according to claim 13 further comprising a smartcard interface means for connecting a smartcard recording means, for reading and writing information stored on a smartcard, said smardcard interface means connected to said data bus and said address bus.

15. A system according to claim 13, wherein said transmitting source further comprises:

(a) a transmitter microprocessor means providing data formatting, said data corresponding to a plurality of products and services available in the system from a plurality of vendors and service providers, said transmitter microprocessor means connected to a data bus;

(b) a dedicated processor means for receiving and buffering asynchronous data from said vendors and service providers, said dedicated processor performing packet formatting, and transmitting said data in a synchronous manner to said data bus, said transmitter microprocessor means polling said dedicated processor for accomplishing said synchronous data transmittal;

(c) a data input device means for loading graphic and prompting information corresponding to the plurality of vendors and service providers, via external memory means, said data input device connected to said data bus for transmitting said information; and (d) a parallel data to video interface means for receiving from said transmitter microprocessor means, data corresponding to said plurality of vendors and service providers, and converting said data into a video format appropriate for video transmission, said transmitter microprocessor means formatting said graphic and prompting data, and time multiplexing and assembling said data for transmission to said parallel data to video interface.

16. A system according to claim 15, wherein the service provided is an event that is broadcasted to authorized receivers, wherein:

(a) said transmitting source broadcasts scheduling information and choice of programs available for viewing;

(b) said receivers further comprising a time and date tracking means for maintaining the actual time and date, said receiver verifying a selected program and corresponding broadcast time and date of said selected program with said scheduling information, said receiver further sending appropriate signals at said broadcast time and date, for tuning to a signal that carries the selected program.

17. A system according to claim 4, wherein said second communication channel, comprises a transmission path between said user and said operator said user transmitting transaction information, said operator transmitting said transaction information to said transaction processor.

18. A transaction system for purchasing tickets and processing corresponding financial transaction in real-time comprising:

(a) a programming transmitter means for broadcasting updated prompting data corresponding to a plurality of performances and sporting events, via a first communication channel, said tickets available for said events;

(b) a plurality of receiver means each serving one user for receiving in each receiver means the identical prompting data broadcast via said first communication channel, each one of said receiver means including RAM storage means and means for downloading and storing within the RAM storage means said prompting data for allowing users to select tickets for a desired event, each of said receiver means including means for transmitting desired ticket information and financial information of said user; each of said receiver means including a processor, programmed instructions and stored information for acting on downloaded information, and means for generating signals to said processor for modifying the downloaded information based on the programmed instructions, stored information and the downloaded information, (c) means for forming a second communication channel originating at said plurality of receiver means and through which the compiled ticket is transmitted;

(d) a database means coupled to said second communication means and containing information on available seats and events, said database means receiving the desired ticket information and said financial information transmitted by said receiver means and transmitted through said second communications channel, said database means verifying said transaction information;

(e) a transaction processor means for receiving financial information from said database means, said transaction processor authorizing payments in real time for said selected tickets, said transaction processor transmitting a verification code to said database means, said database means updating said information on available seat and events, said database means further transmitting verification information to said receiver means.

19. A system according to claim 18, wherein said first communication channel comprising:

(a) a satellite uplink/downlink transmission between said programming transmitter and an operator means for receiving and transmitting information; and (b) a broadcast channel from said operator means to said receiver means.

20. A system according to claim 19, wherein said database means transmits updated information on available performances and events to said programming transmitter.

21. A method for real-time authorization of payment for goods and services from a plurality of retailers available through a video menu having graphics and text information associated with each of said retailers comprising the steps of:

(a) broadcasting the identical video menu to a plurality of receivers;

(b) receiving in each of the receivers the identical video menu and storing the video menu in the receivers for retrieval by a consumer; and downloading and storing within a RAM storage a desired transaction information set from the broadcast information sets, while also acting on the downloaded information within a processor by using programmed instructions and stored information for modifying the downloaded information based on the programmed instructions, the stored information and the downloaded information;

(c) processing within each receiver information concerning a consumer's financial account and customer's selection from the menu;

(d) transmitting to a payment processor the information processed by the receiver which comprises the consumer's financial account and customer's selection from the video menu; and (e) verifying the consumer financial account information by the payment processor, and thereafter authorizing payment for the selection.

22. A method according to claim 21, further comprising the steps of transmitting by said payment processor a payment authorization signal to a financial institution.

23. A method according to claim 22, further comprising the step of forwarding by said financial institution, said payment authorization to said retailer.

24. A method of transaction processing for purchasing tickets and processing corresponding financial transaction in real-time comprising the steps of:

(a) broadcasting the identical updated menus by a transmitter source, the menus corresponding to a plurality of performances and sporting events to a plurality of receivers;

(b) receiving in each of the receivers the identical menus; and each of said receiver means including a processor, programmed instructions and stored information for acting on downloaded information, and means for generating signals to said processor for modifying the downloaded information based on the programmed instructions, stored information and the downloaded information, (c) processing within a respective receiver information concerning a consumer's financial account and customer's selection from the menu;

(d) transmitting to a database means the information processed within the receiver relating to the consumer's financial account and consumer ticket selection from the menus;

(e) verifying the consumer ticket selection by the database means, and transmitting the financial account information by the database means to a transaction processor and thereafter the transaction processor authorizing payment for the selection; and (f) transmitting from the database means updated information to the transmitting source.

25. A method according to claim 24 further comprising the step of transmitting by said transaction processor a payment authorization signal to a financial institution.

26. A method according to claim 25 further comprising the step of forwarding by said financial institution said payment authorization to said database means.

27. A system according to claim 2, wherein said transaction processor after authorizing said desired transaction, verifies said financial information of said user and transmits an authorizing signal to a financial institution, said financial institution making payments to vendors or service providers.

* * * * *

(12) EX PARTE REEXAMINATION CERTIFICATE (10095th)
United States Patent
Bush

(10) Number: US 5,475,585 C1
(45) Certificate Issued: Apr. 3, 2014

(54) TRANSACTIONAL PROCESSING SYSTEM

(75) Inventor: Thomas A. Bush, New York, NY (US)

(73) Assignee: Tugaloo Lavonia GmbH, LLC, Wilmington, DE (US)

Reexamination Request:
No. 90/011,791, Jul. 18, 2011

Reexamination Certificate for:
Patent No.: 5,475,585
Issued: Dec. 12, 1995
Appl. No.: 08/191,143
Filed: Feb. 2, 1994

Related U.S. Application Data

(63) Continuation of application No. 07/591,380, filed on Oct. 1, 1990, now abandoned.

(51) Int. Cl.
*G06Q 20/02* (2012.01)

(52) U.S. Cl.
USPC .......... 705/26.82; 235/380; 705/27.1; 705/39

(58) Field of Classification Search
None
See application file for complete search history.

(56) References Cited

To view the complete listing of prior art documents cited during the proceeding for Reexamination Control Number 90/011,791, please refer to the USPTO's public Patent Application Information Retrieval (PAIR) system under the Display References tab.

*Primary Examiner* — Simon Ke

(57) ABSTRACT

A transactional processing system is used in conjunction with a transmitting source. The system allows for real-time authorization of payments for a plurality of products and services made available by the transmitting source. A video menu is sent to a receiver representing a list of the available products and services. The receiver contains a credit or debit card reader and transmits financial account information, as well as the selection from the menu, via a modem to a payment processor. The payment processor verifies the programming selection and account information and transmits an authorization signal to the vendor or service provider. The payment processor would verify financial account information and forward payment authorization to a financial institution. The vendor, in turn sends the selected product to the consumer upon receiving payment from the financial institution.

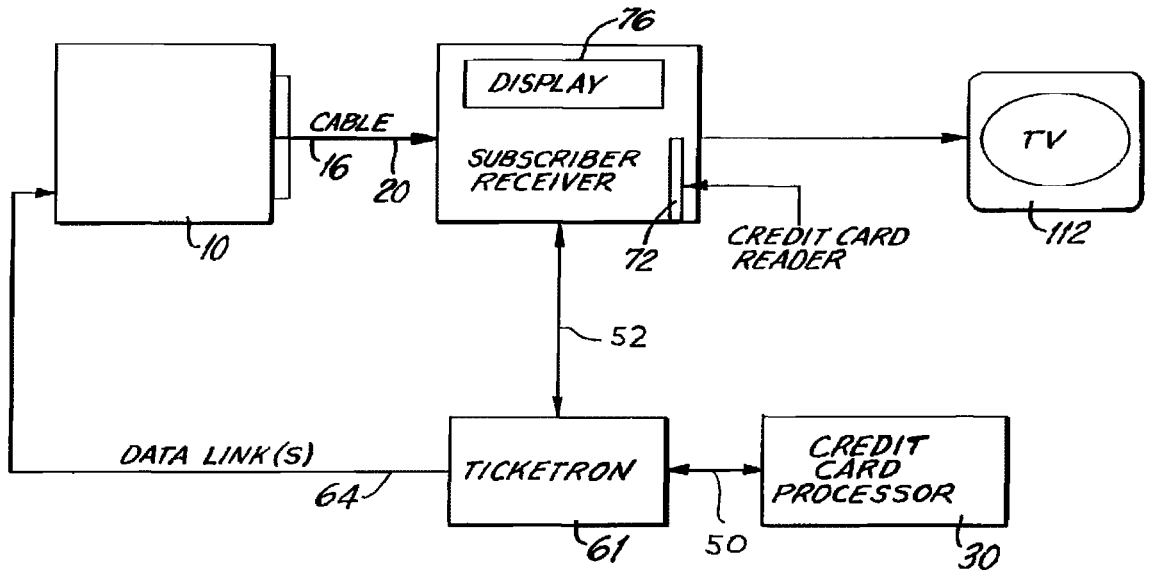

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7, 8 and 10-12 is confirmed.

Claims 1-3, 5, 6, 9 and 21-23 are cancelled.

Claims 4, 13-20 and 24-27 were not reexamined.

\* \* \* \* \*